Feb. 15, 1966  L. R. BELL  3,234,732
HEAT BARRIER FOR ROCKETS
Filed May 28, 1962  2 Sheets-Sheet 1
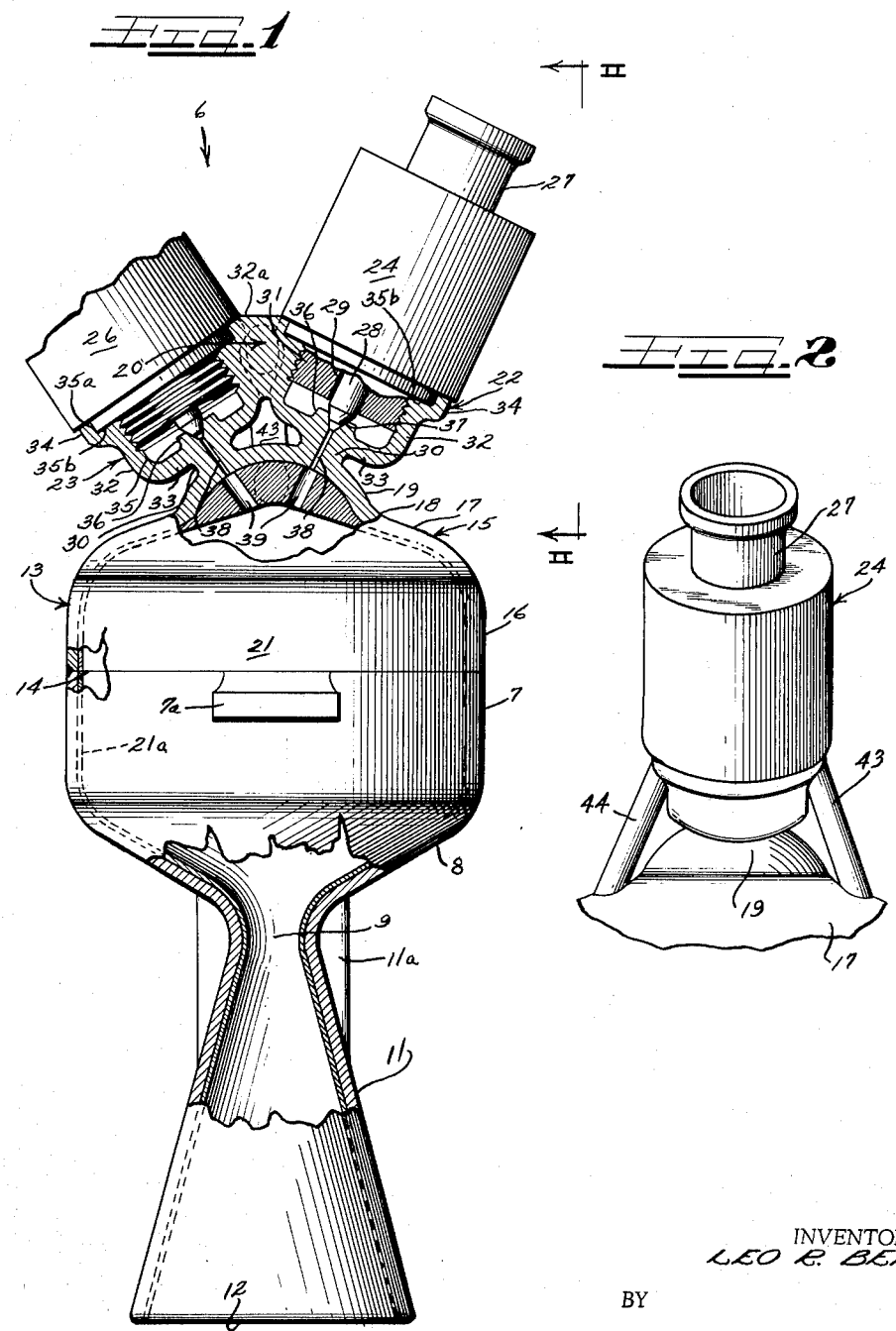
INVENTOR.
LEO R. BELL
BY
Hill, Sherman, Meroni, Gross & Simpson
ATTORNEYS Feb. 15, 1966 L. R. BELL 3,234,732
HEAT BARRIER FOR ROCKETS
Filed May 28, 1962 2 Sheets-Sheet 2

INVENTOR.
LEO R. BELL
BY
Hill, Sherman, Meroni, Gross & Simpson
ATTORNEYS

United States Patent Office 3,234,732
Patented Feb. 15, 1966

3,234,732
HEAT BARRIER FOR ROCKETS
Leo R. Bell, Sherman Oaks, Calif., assignor to
TRW Inc., a corporation of Ohio
Filed May 28, 1962, Ser. No. 198,236
2 Claims. (Cl. 60—35.6)

This invention generally relates to vehicles controlled or propelled by rocket motors which are selectively operated for desired timed durations from remote signal apparatus and more specifically this invention deals with chemical rocket motors which receive thrust gas producing fuels and oxidizers for periods of time that are regulated by signals from apparatus which may be remote from the motors.

The invention will hereinafter be specifically described as embodied in small rocket motors for controlling the attitude of orbiting vehicles relative to the earth, but it should be understood that motors of this invention are generally useful for any type of vehicle.

In accordance with this invention a plurality of small rocket motors are positioned around the periphery of a satellite and are selectively energized from signals of desired duration which can be sent from earthbound equipment to correct or change the attitude of the orbiting satellite relative to the earth. Each rocket motor is equipped with a fuel injector and an oxidizer injector to deliver, into the combustion chamber of the rocket motor, correct proportions of fuel and oxidizer for hypergolic reaction to produce thrust gases for exiting through the rocket nozzle. Each injector has a fixed delivery tube for a constant delivery rate and "on-off" valve control flow to each delivery tube. Each valve is operated in response to signal means. Since this signal means may be earthbound and can be individually tuned to each rocket motor, the exact duration of operation of any given rocket motor can be controlled.

A problem in attitude controlled rockets arose from heat transfer from the rocket body to the fuel and oxidizer injectors of the pulsing rockets. Heating of the fuel and oxidizer valves causes vaporization of the propellant and increases the minimum amount of impulse that is available. It is desirable to maintain control to produce a minimum impulse bit for rockets because over-control and hunting can be avoided by delivering just the necessary small amount of impulse that is to correct attitude. Further, heat from the rocket body, when transferred to the solenoid core, reduces the effective response of the solenoid valve means.

The present invention eliminates the problem of heat transfer by providing a heat barrier or heat dam between the rocket body and the mounting boss for the fuel and oxidizer injections.

While the rocket motors as hereinafter specifically described are quite small and are used for attitude control of orbiting vehicles, it is obvious that larger motors could be used for propelling a rocket vehicle without departing from the principles of this invention.

It is an object of this invention to provide an oribiting type vehicle with attitude control rockets that are selectively actuated for desired periods of times from remote control apparatus to maintain the vehicle in any desired attitude pattern relative to the earth.

Another object of this invention is to provide chemical rocket motors which are remotely controlled to deliver thrust only when desired and then only for accurately controlled durations of time.

Anoher object of this invention is to provide a rocket motor with fixed fuel and oxidizer injectors that are actuated from remote signal sending devices to deliver correct proportions of hypergolically reacting fuel and oxidizer for controlled time periods.

A still further object of this invention is to provide a chemical rocket with fixed delivery tube injectors in on-off valves controlled from a distance.

It is still another object of this invention to provide a rocket vehicle with one or more rocket motors delivering rated thrust for durations of time that are selectively controlled and provided with a heat barrier or heat dam between the rocket body and the mounting boss for the fuel and oxidizer valves.

It is still another object of the present invention to provide a rocket motor with fixed fuel and oxidizer injectors that are actuated to deliver correct proportions of hypergolically reacting fuel and oxidizer for controlled time periods and providing a heat barrier or heat dam between the rocket body and the valve assembly for the fuel and oxidizer injectors.

Other and further objects of this invention will be apparent to those skilled in the art from the following detailed description of the annexed sheets of drawings, which by way of a preferred example only, illustrate two embodiments of the invention.

On the drawings:

FIGURE 1 is a partial cross-sectional view of one of the attitude control rocket motors of the present invention with parts in elevation;

FIGURE 2 is a side view of the upper portion of the attitude control rocket motor, taken along lines II—II of FIGURE 1;

As shown on the drawings:

Figure 3:
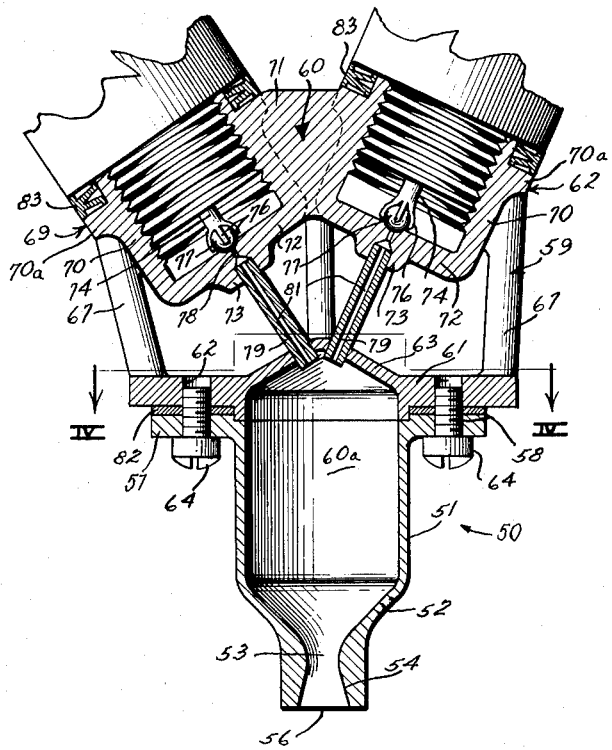
FIGURE 3 is a cross-sectional view of another attitude control rocket motor of the present invention with parts in elevation.

In accordance with this invention a plurality of attitude control rocket motors are mounted on a rocket vehicle. These motors are the chemical reaction type and are fed with fuel, such as hydrazine, and with oxidizer, such as red fuming nitric acid. The fuel and oxidizer that are used to control the attitude rockets of the present invention may also be the fuel and oxidizer used to propel the main rocket motor of the rocket vehicle.

As shown in FIGURE 1, each rocket motor 6 has a cylindrical body portion 7 with a conical or tapered end wall 8 converging to a throat 9 and then diverging to define an exhaust nozzle 11 with an exit opening 12 larger than the throat 9 and a head portion 13 affixed at 14 to the cylindrical walls 7. The head portion has a cylindrical wall 16, which form a continuous wall with a cylindrical wall 7, and an end wall 15. A combustion chamber 21 is thereby provided between the end walls 15 and 8 and thrust gases from this chamber 21 are discharged through the throat 9 and nozzle 11 to deliver a propelling force in the direction of the end wall 15.

The exhaust nozzle at the throat area may be reinforced by ribs 11a and the body portion may contain means 7a to mount the attitude rocket onto the space vehicle.

The end wall 15 has a conical or tapered wall portion 17 converging to 18 and then convexing to define a central convex wall 19. The wall 19 has separated therefrom and integral therewith a mounting boss 20 defining two valve assemblies 22 and 23. The valve assemblies 22 and 23 are internally threaded to respectively receive and threadedly fasten thereto a solenoid valve controlled oxidizer injector 24 and a similar solenoid controlled fuel injector 26.

The injectors are typical solenoid injectors with a coil surrounding a hollow core in slidable relation. The core receives fluid freely therethrough from an inlet nipple 27 and at its downstream end carries a needle valve 28 supported therefrom by a spider or perforated plate so that the fluid can flow freely from the core around the valve in a passageway 29 provided by a threaded stem 31, which is threaded into the valve assembly.

Each valve assembly is provided with an incomplete cylindrical housing 32 interconnected to each other at 32a, a separate transverse base 33, and an open interconnected stepped-end 34. The open end provides a cylindrical cavity 35 that extends to the base and a counterbore 35a providing a shoulder 35b. Projecting inwardly and centrally from the base of the cavity 35 is a protrusion or nipple 36. The nipple 36 defines a frusto-conical valve seat 37 converging to a small diameter tubular delivery passage 38 which connects a larger diameter tubular passage 39. The tubular passage 39 communicates with the combustion chamber 21. In order to minimize the volume between the combustion chamber and the valve assembly, so that a minimum impulse bit is supplied, the passages 38 have the lowest possible $L/D$ ratio with 5:1 up to 15:1 ratios being desired.

A heat barrier or heat dam is provided by having the mounting boss 20 spaced from the rocket body and connected thereto by integral valve assembly necks or integral delivery tubes 30. The necks 30 connect each valve assembly base portion 33 to the wall 19 and is concentric with the nipple 36. Also, the mounting boss is rigidified by rigidifying braces 43 and 44 which extend from each side of the valve assembly interconnection 32a to the wall 17 and are spaced approximately 180° apart.

The rigidifying braces and necks are exposed to provide for heat dissipation. Also, the air space between the top of the rocket body and mounting boss provides an excellent heat insulator or heat barrier for maintaining the mounting boss relatively cool.

In addition, there is provided a "Rockide" coating throughout the entire interior of the rocket motor-combustion chamber and exhaust nozzle. The Rockide substantially fills in the area in the combustion chamber under the convex wall 19 and defines the delivery passages 39. This extra-thick Rockide under the convex wall provides additional heat barrier means for preventing the transfer of heat from the rocket motor combustion chamber to the mounting boss.

In operation, the passageways or tubular conduits 38 and 39 are of fixed dimensions, for both the oxidizer and fuel injector, to control the rate and reaction of fuel and oxidizer. The valve 28 with its conical head seats in the nipple conical seat 37 in the normal off position of the valve 28. When the solenoid injector coil is energized the valve 28 will be unseated to fully open the orifice or tubular passageway 38. The valve 28 is of the "on-off" type and is not a metering valve.

As illustrated, the oxidizer injector 24 has tubular passages 38 and 39 which are much larger than the tubular passages 38 and 39 for the fuel injector 26. Thus, when the rocket motor is operated with an oxidizer, such as red fuming nitric acid, and with a fuel, such as a mixture composed of 30 percent by weight of hydrazine and 70 percent by weight of unsymmetrical dimethyl hydrazine, the correct reacting hypergolic mixture for the combustion chamber 21 will be 2.16 parts by weight of acid for each one part by weight of fuel. In such instances, the tubular delivery means will be sized to deliver the correct ratios of fuel and oxidizer. The interior of the rocket has an insulating coating 21a of a material such as Rockide and the tubular delivery means 39 are completely surrounded by the Rockide to provide excellent insulation properties.

The valve assemblies 22 and 23 and delivery passageways 38 and 39 are fixed at a particular angle so that the impingement area and angle of feed are accurately maintained. The area and angle of feed is important in providing a complete combustion of the oxidizer and fuel. As is seen, the valve assemblies of the present invention are spaced from the rocket body by their neck or delivery tube 30 and the thin and long rigidifying braces 44 and 43, which provide maximum heat dissipating area. By providing a heat insulation such as the Rockide, the heat that is transferred from the rocket body to the valve seats and injectors is held at a minimum. Heating of the valves causes vaporization of the propellant and increases the numerous amount of impulse bit available; causes the valve to stick; and causes the solenoid core to operate improperly. All of which causes "over-control" and "hunting." Therefore, the present invention provides, as illustrated by FIGURES 1 and 2, a rocket motor which is capable of maintaining a relatively cool mounting boss to prevent over-heating of the solenoid core, the valve, and the propellant within the valves, and affords extremely accurate delivery of the necessary small amount of impulse that is needed to correct the attitude of the space vehicle by supplying a steady amount of fuel and oxidizer in accordance to the duration of the signal received by the rocket motor.

Figure 4:
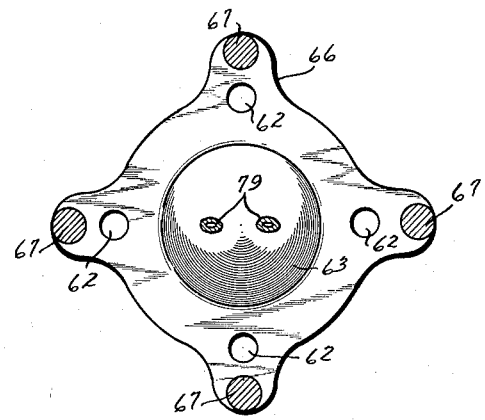
FIGURE 4 is a transverse cross-sectional view taken along the lines IV—IV of FIGURE 3.

Referring to FIGURES 3 and 4 there is shown another embodiment of the present invention. There is illustrated a rocket motor 50 having a tubular body 51 with an end wall 52 converging to form a throat 53 which interiorly diverges to define an exhaust nozzle 54 which has exit opening 56 larger than the throat 53. The other end of the tubular body 51 has an annular flange 57 defining four bores 58 therethrough spaced approximately 90° apart.

Mounted on the flange 57 is the attitude rocket head 59. The rocket head 59 has a cylindrical wall 60 which forms a continuous wall with wall 51 when the head portion is connected to body 51; a flange 61 with four bores 62 therethrough spaced approximately 90° apart; a converging conical end wall 63; a mounting boss 65; and four long and thin rigidifying braces 67.

The combustion chamber 60a is defined by the converging conical wall 63 and the converging end wall 53. The bores 62 are aligned with the bores 58 so that the rocket head 59 may be mounted to the rocket body 51 by fastening means 64 and the flange 57 is separated from the flange 61 by an insulating washer 82. The flange 61 as shown in FIGURE 2, has formed thereon four nipples 66 extending approximately 90° apart and radially aligned with the bores 62.

The head 59 has extending from the ends of the nipples 66 the four cylindrical rigidifying braces 67. The braces 67 maintain the mounting boss 60 at rigid and fixed position away from the rocket motor body and are long and thin to provide maximum heat dissipating area.

The mounting boss 60 defines two valve assemblies 68 and 69. Each valve assembly has an incomplete cylindrical housing 70 interconnected at 71 to the other valve assembly, a transverse base wall 72, an open end, and a shoulder 70a on the housing wall. The housing wall and base wall define a threaded cavity.

Threaded into each cavity is a solenoid controlled valve for delivering oxidizer to the valve assembly 68 and fuel, such as hydrazine, to the valve assembly 69. The solenoid valves are operated in the same manner as the valve illustrated in the embodiment of FIGURES 1 and 2.

However, valve stem 74, in this embodiment, has a plurality of fingers 76 which grasp a synthetic sapphire ball 77 which is seated to close and open a passageway 78 provided centrally in the base 72 of each valve assembly.

Connecting the base 72 with the combustion chamber 60 is a cylindrical neck or delivery tube 79 having a passage 81 therethrough. The cylindrical neck is mounted within a nipple 73 protruding outwardly from the base 72 and is affixed to the nipple 73, so that the passage 81 is aligned with the passage 78. The neck 79 for the oxidizer valve 68 and the neck 79 for the fuel valve 69 are sized to provide the correct rate and reacting ratio of hypergolic mixture for the combustion chamber 60a.

To insure the lowest possible heat transfer between the rocket motor body and the fuel and oxidizer the rigidifying bars are long and narrow to provide for the maximum heat dissipating area; provided heat insulation between the solenoid and an insulating seal 83; between the solenoid and valve assembly shoulder 70a; and the narrow necks 79 connecting the valve assemblies with the rocket body should be thin and the delivery passageways should have the lowest possible $L/D$ ratio with 5:1 up to 15:1 ratios being desirable and the outer dimensions of the neck should only be large enough to hold pressure in the passageway. This pressure may be up to 1000 p.s.i., and for stainless steel, the thickness may be from "0.008 to 0.08." The long thin neck portions as well as the long rigidifying brace portions are exposed and therefore allow readily for the dissipation of heat. Also, the long thin passages minimize the volume between the valve assembly and combustion chamber.

Both the rocket motor 6 and the rocket motor 50 are preferably formed by two pieces which are separately cast—the rocket motor head and the rocket motor body. The rocket motor is made typically from stainless steel.

The motors being of the chemical reacting type, will deliver thrust immediately upon development of a hypergolic reaction in the combustion chambers. This hypergolic reaction in turn is immediately started as soon as the injectors are open. Since the injectors are of the "on-off" type, they are either fully open or fully closed, and the rocket motor thus delivers the rated thrust only for the duration in which the injectors are open. The oxidizer and fuel injectors are spaced from the rocket motor thereby providing a heat barrier or heat dam between the injectors and the rocket body. The heat dam or barrier prevents the fuel and the oxidizer from vaporizing and also prevents the heat distortion of the solenoid operated valve injector. By providing a heat barrier or heat dam a minimum volume delivery passages, there is provided means to inject the exact minimum amount of oxidizer and fuel to provide the correct minimum impulse bit. This thereby completely eliminates over-control and "hunting" of the space vehicle.

From the above description it will therefore be understood that this invention now provides for accurate control of the attitude of an orbiting vehicle by remote control of the duration of operation of small rocket motors which are so positioned on the vehicle that thrust therefrom will be delivered in directions forcing the vehicle to change its attitude relative to the earth. Signals for "on-off" operation of the attitude control rockets may be sent from earthbound stations. Equipment on the orbiting vehicle may thereby be selectively positioned relative to the earth as the vehicle moves in its orbit.

I claim as my invention:

1. A rocket motor supplying a steady desired amount of fuel and oxidizer in accordance to the duration of a signal received for controlling the attitude of space vehicles comprising:
   a housing defining a combustion chamber and an exhaust nozzle having an exhaust opening,
   a housing end wall having a central convex portion opposite said exhaust opening,
   a mounting boss,
   a fuel valve assembly mounted on said mounting boss,
   an oxidizer valve assembly mounted on said mounting boss,
   an angled oxidizer neck connecting the oxidizer valve assembly with the central convex portion of said end wall and forming an angled oxidizer delivery passageway,
   an angled fuel neck connecting the fuel valve assembly with the central convex portion of said end wall and forming an angled fuel delivery passageway,
   an insulating coating on the entire inner surface of said housing and filling the undersurface of said convex portion,
   a fuel passage formed in the insulation coating and coaxial with and of greater diameter than the fuel delivery passageway,
   an oxidizer passage formed in the insulation coating and coaxial with and of greater diameter than the oxidizer delivery passageway,
   said fuel and oxidizer delivery passageways communicating the oxidizer and fuel valve assemblies with said combustion chamber for delivering a hypergolic fuel and oxidizer in impinging relation within said combustion chamber,
   said fuel and oxidizer delivery passageways being sized to deliver the correct rate and ratio of oxidizer and fuel to said combustion chamber for effecting a complete hypergolic reaction therebetween,
   said fuel and oxidizer passageways converging from the valve assembly to the combustion chamber and providing a fixed angle of feed and impingement area for fuel and oxidizer fed to the combustion chamber through said fuel and oxidizer delivery passageways, said fuel and oxidizer delivery passageways having a $L/D$ ratio of between 5:1 to 15:1 to minimize the volume between the valve assemblies and the combustion chamber,
   an on-off solenoid operated valve mounted in each of the fuel and oxidizer valve assemblies,
   said mounting boss being separated from said housing and mounted thereon by said fuel and oxidizer necks, and
   said insulating coating and the separation between the mounting boss and the housing providing a heat barrier for said valve assemblies
   whereby fuel and oxidizer may be accurately delivered to the combustion chamber for providing the attitude rocket with a minimum impulse bit.

2. A rocket motor supplying a steady desired amount of fuel and oxidizer in accordance to the duration of a signal received for controlling the attitude of space vehicles comprising:
   a body portion defining an exhaust nozzle with an exhaust opening,
   a one-piece head portion connected to said body portion and an end wall forming a combustion chamber with the head portion,
   said head portion end wall having a convex central portion opposite said exhaust opening,
   said head portion having integral rigidifying braces and an integral mounting boss,
   a fuel valve assembly mounted on said mounting boss,
   an oxidizer valve assembly mounted on said mounting boss,
   said rigidifying braces connected to and integral with said end wall and said mounting boss,
       said rigidifying braces being long and thin to present the maximum area for heat dissipation,
   an angled oxidizer neck connecting the oxidizer valve assembly with the central convex portion of said end wall and forming an angled oxidizer delivery passageway,
   an angled fuel neck connecting the fuel valve assembly with the central convex portion of said end wall and forming an angled fuel delivery passageway,
   an insulating coating on the entire inner surface of said housing and filling the undersurface of said convex portion,
   a fuel passage formed in the insulation coating and coaxial with and of greater diameter than the fuel delivery passageway,
   an oxidizer passage formed in the insulation coating and coaxial with and of greater diameter than the oxidizer delivery passageway,
   said fuel and oxidizer delivery passageways communicating the oxidizer and fuel valve assemblies with said combustion chamber for delivering a hypergolic fuel and oxidizer in impinging relation within said combustion chamber, said fuel and oxidizer delivery passageways being sized to deliver the correct rate and ratio of oxidizer and fuel to said combustion chamber for effecting a complete hypergolic reaction therebetween, said fuel and oxidizer passageways converging from the valve assembly to the combustion chamber and providing a fixed angle of feed and impingement area for fuel and oxidizer fed to the combustion chamber through said fuel and oxidizer delivery passageways, said fuel and oxidizer delivery passageways having a $L/D$ ratio of between 5:1 to 15:1 to minimize the volume between the valve assemblies and the combustion chamber, an on-off solenoid operated valve mounted in each of the fuel and oxidizer valve assemblies, said mounting boss being separated from said housing and mounted thereon by said rigidifying braces and said fuel and oxidizer necks, and said insulating coating and the separation between the mounting boss and the housing providing a heat barrier for said valve assemblies whereby fuel and oxidizer may be accurately delivered to the combustion chamber for providing the attitude rocket with a minimum impulse bit.

References Cited by the Examiner

UNITED STATES PATENTS

| 2,406,926 | 9/1946 | Summerfield | 60—35.6 |
| 2,456,402 | 12/1948 | Goddard | 60—39.74 X |
| 2,706,382 | 4/1955 | Logan et al. | 60—35.6 |
| 3,048,969 | 8/1962 | Horner | 60—35.6 |
| 3,088,406 | 5/1963 | Horner | 60—35.6 X |
| 3,100,963 | 8/1963 | Michel | 60—35.6 |

MARK NEWMAN, *Primary Examiner.*

JULIUS E. WEST, CARLTON R. CROYLE, *Examiners.*